May 5, 1964 S. M. SHOBERT 3,131,979
PLASTIC BEARING
Filed Jan. 2, 1962 2 Sheets-Sheet 1
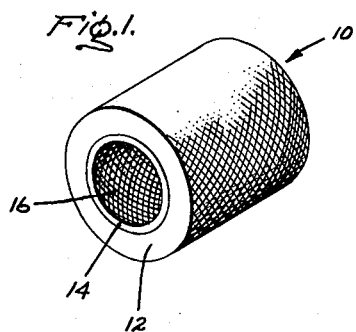
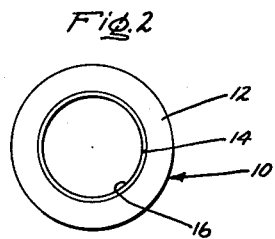
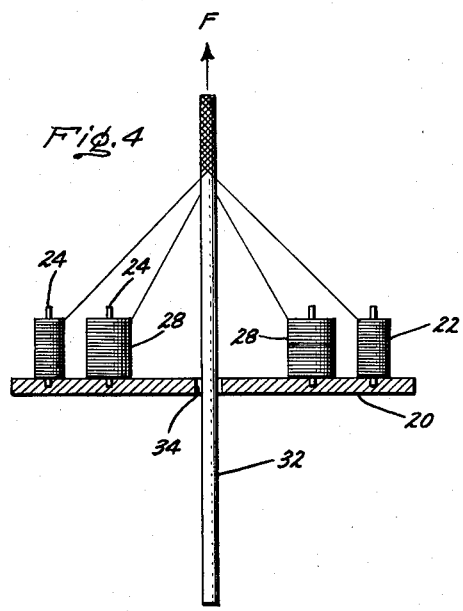
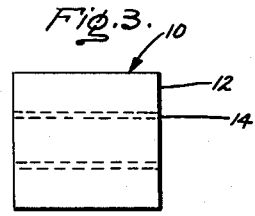
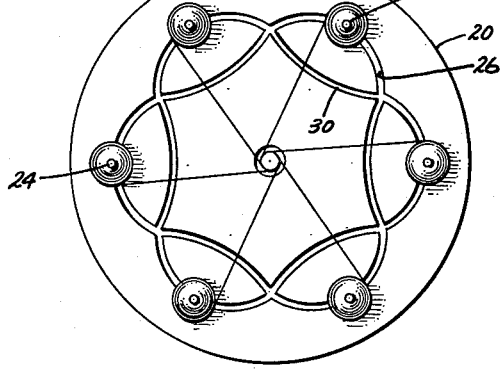
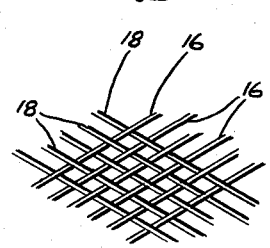
Inventor:
Samuel M. Shobert,
by Hood, Gust & Irish
Attorneys.

May 5, 1964 S. M. SHOBERT 3,131,979
PLASTIC BEARING
Filed Jan. 2, 1962 2 Sheets-Sheet 2
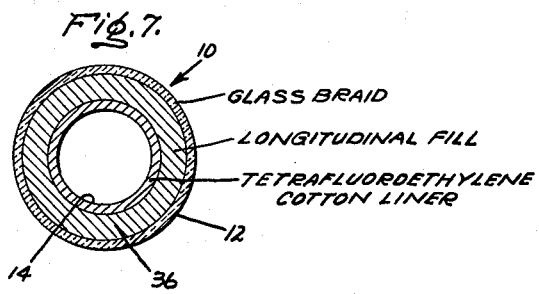
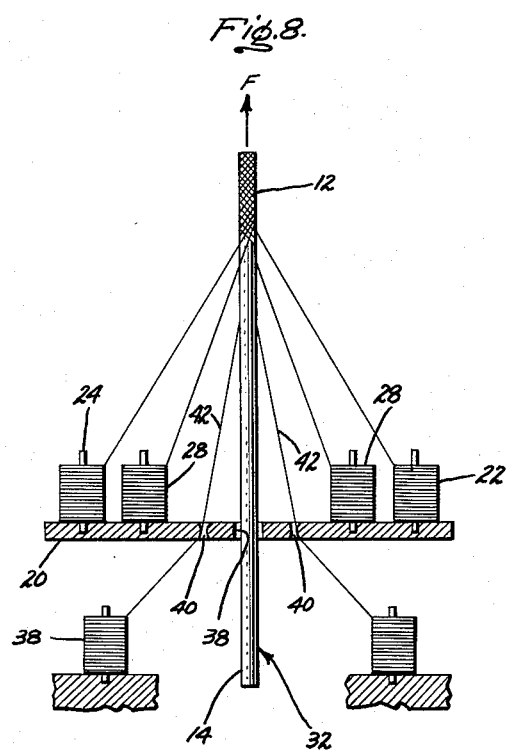
Inventor:
Samuel M. Shobert,
by Hood, Gust & Irish
Attorneys.

United States Patent Office 3,131,979
Patented May 5, 1964

3,131,979
PLASTIC BEARING
Samuel M. Shobert, 16050 Ireland Road, Mishawaka, Ind.
Filed Jan. 2, 1962, Ser. No. 163,585
7 Claims. (Cl. 308—238)

The present invention relates to a shaft bearing and more particularly to a bearing that does not require oil or the like for lubrication.

A plastic material, tetrafluoroethylene (Teflon), a thermoplastic material, has been discovered as being an excellent bearing material from the standpoints of both lubricity and wear. It is therefore not surprising that many attempts have been made for using the material in bearing structures; however, these attempts have been attended with certain difficulties which are primarily attributable to the characteristics of the material itself. For example, not only is the material extremely expensive, but it has been found to be dimensionally unstable. By being dimensionally unstable is meant that the material deforms under load, since it possesses, as do other thermoplastic materials, a certain flow which causes the structure to change shape when loads are applied thereto. Thus, while tetrafluoroethylene alone has been found to be an excellent bearing material, this quality prevails only so long as no loads have been involved.

A successful bearing must possess the usual characteristics of excellent wear, low friction, dimensional stability and yet be economical, and up to the date of this invention the bearing structures formerly fabricated of tetrafluoroethylene have not possessed all of these necessary characteristics and requirements.

It is therefore an object of this invention to provide a shaft bearing having as one of its constituents the plastic material tetrafluoroethylene in a structure which satisfies the requirements of wear-life, lubricity, dimensional stability, economy and compression strength.

It is another object of this invention to provide a bearing structure which has as one of its elements a thread composed of the stable fibers of both cotton and tetrafluoroethylene so interlocked together as to provide a lubricous bearing surface.

Still another object of this invention is to provide a bearing structure composed entirely of plastic or resinous material having as a filler a composition tetrafluoroethylene-cotton thread and glass thread as a backing therefor.

Other objects will become apparent as the description proceeds.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a perspective illustration of a bearing of this invention;

FIG. 2 is an end view thereof;

FIG. 3 is a side view thereof;

FIG. 4 is a diagrammatic illustration, partly in vertical section, of an apparatus used in the fabrication of this bearing;

FIG. 5 is a top plan view in diagrammatic form of the arrangement of FIG. 4;

FIG. 6 is an enlarged view of a small area of the interleaved threads in the bearing as woven by the apparatus of FIGS. 4 and 5;

FIG. 7 is a cross-section of another embodiment of the bearing; and

FIG. 8 is a diagrammatic illustration, partly in vertical section, of another apparatus used in fabricating the bearing of FIG. 7.

Referring to the drawings, the bearing is fabricated of essentially the same materials as are conventionally used in glass-reinforced plastic fishing rods and the like. As an exception to this, however, a lamination of tetrafluoroethylene-cotton thread is uniquely arranged in the bearing and is combined with the glass-reinforced plastic as will be described in more detail hereinafter.

As shown in FIGS. 1, 2 and 3, the cylindrical bearing indicated generally by the reference numeral 10 is composed of essentially two laminations 12 and 14 which are tubular in shape and coaxial in position. Also, these laminations are contiguous with each other and uniquely assembled into a unitary, compact structure.

The tubular lamination 14 is constituted primarily of a tetrafluoroethylene-cotton thread in the form of a helical braid, this thread being a single 2⅝ run size of about 4,200 yards per pound. This thread is composed of the staple fibers of cotton and tetrafluoroethylene which are physically interlocked and twisted together into a unitary thread. The proportion of tetrafluoroethylene and cotton is about half and half, there being a multiplicity of tiny fibers approximately three inches (3") long constituting the tetrafluoroethylene and fibers of cotton about one and one-half (1½) inches long constituting the cotton component.

The particular twisted thread of staple fibers is in distinct contrast with continuous monofilament thread, the twisted thread providing a better and homogeneous distribution of tetrafluoroethylene material throughout the body of the thread than is possible with a monofilament thread. This twisted thread is fabricated by means of conventional equipment wherein wire brushes comb the short, discontinuous stable fibers into a common direction, the fibers then being twisted together in the formation of the final thread.

The pattern of the braid is graphically illustrated in FIG. 6 and is shown as comprising a plurality of threads 16 and 18 which are criss-crossed in woven relationship with each of the threads 16 and 18 alternately passing over and under each other as shown. Each thread 16, 18 follows the form of a helix from one end of the bearing 10 to the other.

In one working embodiment of this invention, the size of the tetrafluoroethylene-cotton thread was in the order of 30 to 40 gauge, the cotton and tetrafluoroethylene fibers being twisted together in the formation of the thread.

A second lamination 12 of helically braided glass threads coaxially overlies the tubular lamination 14, these threads being braided together in the same pattern as shown in FIG. 6. Both of these laminations 12 and 14 are imbedded in epoxy of polyester resin of the type conventionally used in the fabrication of glass-reinforced plastic fishing poles; however, the inner peripheral surface 16 of the lamination 14 is kept free of this resin so as to provide full exposure of the raw tetrafluoroethylene fibers which constitute the thread of the lamination 14.

As will now be apparent, the two laminations 12 and 14 are intimately and rigidly bonded together by means of the resin material described hereinabove.

The glass threads used in the lamination 12 preferably are of the glass yarn type, each thread being composed of a multiplicity of tiny elongated fibers which, in effect, when bundled together form the final continuous length of thread. Also, this thread may consist of a plurality of glass strands or threads or still further be in the form of roving without departing from the scope of this invention.

The method of fabricating the bearing will now be explained. Referring to FIGS. 4 and 5, a conventional braiding machine carries on its supporting table 20 a suitable number (six, in the present instance) of spools 22 of thread. At this stage of processing, it is assumed that this thread is of the tetrafluoroethylene-cotton composition as explained previously. The spools 22 are supported on suitable spindles 24 which fit into guide grooves 26, which grooves follow an undulating pattern as illustrated in FIG. 5. There are two series of spools on the table 20, the spools 22 being characterized herein as the outer spools, while the spools 28 are considered as the inner spools. The only reason for this characterization is to demonstrate more clearly by reference to FIG. 5 that there are two different undulating grooves 26 and 30 which cross over symmetrically as illustrated, and the spools 22 and 28, respectively, ride in these grooves.

A mandrel 32, cylindrically shaped, is passed through a clearance opening 34 in the table 20 as shown. An operator can hold this mandrel 32 in position and operate it in the proper manner, as will be explained in the following.

Threads from the respective spools 22 and 28 are individually affixed to the upper end of the mandrel 32 by some suitable means whereupon the apparatus is ready for operation.

In operation, the mandrel 32 is slowly raised in the direction of the arrow "F," while the spools 22 and 28 are moved at a uniform rate of speed through the guiding grooves 26 and 30, respectively. Considering for a moment the motion of one spool 22, it will form an interleaving braid with the threads from the spool 28. The mandrel 32 is continuously raised at a uniform rate until the braiding operation is completed for the entire length thereof. The individual threads are then cut, thereby leaving the mandrel 32 with a braid covering of tetrafluoroethylene-cotton thread.

As the next operation, the mandrel 32 with the first layer of braid just described is run through another braiding apparatus identical to the one disclosed in FIGS. 4 and 5 but which differs only in the respect that the spools 22 and 28 contain glass thread. By this means, a helical braid of glass thread is applied to the tubular covering of tetrafluoroethylene-cotton thread. Preferably, still a second and in some instances a third layer of glass thread is applied to the mandrel, thereby building up a substantial thickness of the glass thread lamination in comparison to the tetrafluoroethylene-cotton lamination. The radial thickness of the lamination 12 is therefore greater than the radial thickness of the lamination 14.

The mandrel with its composite covering is next immersed, or wetted by some suitable means, in a bath of liquid resin material, which material is conventionally used in the glass-fishing-rod art. Making certain that all of the threads are thoroughly impregnated with this resin material, the mandrel with its impregnated covering is placed in a curing mold or oven. The mold or oven is heated by the use of steam or electricity until the resin material is completely cured and hardened. In the preferred embodiment of this invention, the resin is either of the polyester or epoxy type. As the last step, the mandrel 32 is removed from the resin supported braids, the resultant product being a hollow self supporting tube which is composed of tubular laminations of glass and tetrafluoroethylene-cotton threads.

It is important at this point to note that the tetrafluoroethylene-cotton braid which is applied to the mandrel 32 is intimately wound or wrapped onto the mandrel such that when the mandrel and its various braided laminations or layers are impregnated with resin, the resin will not penetrate to the mandrel in the areas contacted by the tetrafluoroethylene fibers or material but will leave the tetrafluoroethylene which is in contact with the mandrel free and clear of any resin. Also, the resin does not wet the tetrafluoroethylene but does wet the cotton thereby forming a matrix securing the tetrafluoroethylene fibers in position.

As already stated, the resultant product after removal of the mandrel 32 is a self-supporting, hollow tube of resin or plastic material in which the braided laminations already described are imbedded. This finished tube may then have its outer surface ground smooth to a cylindrical shape which is coaxial with the inner peripheral surface 16. In connection with providing individual bearing units such as illustrated in FIGS. 1 and 3, the elongated tube after it is ground is cut into short lengths as may be needed for any particular application to which the bearing is to be put.

The bearing of this invention has found particular utility in mounting the shafts of electric motors. After the bearing is initially installed in the housing of the motor and the shaft is inserted through the central opening thereof, the initial rotation of the shaft in the bearing destroys the cotton in the tetrafluoroethylene-cotton thread, leaving only the tetrafluoroethylene fiber which now seats itself. From this point forward, a trouble-free bearing is provided which satisfies all of the requirements earlier stated of dimensional stability, economy, long wear-life and lubricity. The lubricity arises from the tetrafluoroethylene material itself which needs no lubrication.

In actual tests, it has been found that a bearing having an outer diameter of three-quarters of an inch, an inner diameter of one-half inch, withstood a 10,000 pound eccentric load on the motor shaft for 10,000 revolutions without producing any indication of wear. Following this, the bearing was subjected to a 20,000 pound offcenter load and was taken through another 10,000 cycles. The bearing was again examined and found to be free of any wear. In still another test, a load of 74,000 pounds was applied to the shaft in a radial or eccentric direction, and when it was removed, a measured indentation of only .003 inch in the bearing was found to result. Thus, these tests demonstrated that the bearing was dimensionally stable and clearly overcame the earlier problems involved in the use of tetraethylene material in which even mild loads produced deformation which made the material unsuitable for heavy-duty bearing purposes.

From the foregoing, it will be seen that the bearing possesses unusually high strength in compression. This is obviously a design requirement in all electric motors intended to undergo heavy load usage.

One of the reasons why it is believed that the bearing possesses such high compressive strength and dimensional stability is the fact that only a minimum of tetrafluoroethylene material is used. This is evidenced by the fact that only a single layer or braid of tetrafluoroethylene-cotton thread is applied to the mandrel 32 in the fabrication of the bearing, whereas the backing for this layer may consist of several layers or braided laminations of glass thread. The cotton acts as a diluent in the tetrafluoroethylene-cotton thread, and by the use of braiding only a very thin layer of the thread is applied which not only positions the tetrafluoroethylene fibers where they should be, but also constitutes an economy in the use of an expensive material. It is theorized that if a heavier or greater amount of tetrafluoroethylene were used, the finished bearing would not have the dimensional stability nor high compression strength as already explained inasmuch as tetrafluoroethylene normally deforms under load and therefore does not possess either of the qualities or characteristics of dimensional stability or compression strength. While the braid serves as one means of applying a very thin layer of the tetrafluoroethylene-cotton thread, it also serves in locking the tetrafluoroethylene in proper position which is thereafter mechanically and chemically bonded in this position by means of the resin. The exterior backing of glass threads and resin gives the bearing considerable strength, this backing also contributing to the dimensional stability and compression strength of the finished bearing as previously mentioned.

A different embodiment of the bearing is illustrated in FIG. 7 wherein three discrete, coaxial laminations are shown. Like numerals indicate like parts. The inner lamination or liner 14 is the same as that described in connection with FIG. 1. However, the second lamination 36 which is coaxially contiguous with the inner liner or lamination 14 is composed of polyester or epoxy resin reinforced by glass thread or yarn which, instead of being braided or interwoven, extends longitudinally of the bearing. There is a sufficient quantity of the glass thread or yarn in this lamination 36 to substantially fill the same with the resin filling the spaces in between the fibers of the glass yarn.

Then, on top of the lamination 36 is a layer 12 of glass thread, preferably only a single layer of braid being used.

In the fabrication of this bearing of FIG. 7, the braided lamination 14 is formed precisely as previously explained hereinbefore in connection with FIG. 4, a single braided layer of tetrafluoroethylene-cotton thread being directly braided onto the mandrel 32. This mandrel 32 with the braided layer of tetrafluoroethylene-cotton thread thereon is inserted in the apparatus of FIG. 8 wherein like numerals indicate like parts. This apparatus of FIG. 8 differs from that shown in FIG. 4 in only one respect, that being the addition of several spools of glass yarn or thread 38 which may number in the neighborhood of from six to twelve, which are disposed beneath the table 20 as shown, in circular arrangement. The thread from each spool 38 is passed through a respective clearance opening 40 in table 20 and attached by some suitable means to the upper end of the mandrel 32. Thus, as the mandrel 32 is pulled upwardly in the direction of the arrow F in FIG. 8, thread is pulled off each spool 38 which will extend in a direction substantially parallel to the mandrel 32 or in other words will extend longitudinally thereof.

After fastening the threads from the spools 38 to the upper end of the mandrel 32 (this mandrel 32 having the braided layer 14 of tetrafluoroethylene-cotton thread thereon), the mandrel 32 is axially moved in the direction of the arrow F drawing threads 42 therewith. Simultaneously, a layer of glass thread is braided over the longitudinal threads 42, there being enough threads 42 to substantially fill the annular space between the braided glass layer 12 and the inner braided liner 14. Thus, when the mandrel 32 is pulled completely through the apparatus, it will have the cross-sectional composition as already explained in connection with FIG. 7.

In this embodiment of FIG. 7, the braided layer 12 retains the longitudinal threads constituting the lamination 36 in position such that when the mandrel 32 with all three layers 14, 36 and 12 applied thereto is immersed in and impregnated with resin, curing of the resin will lock all of the threads and fibers securely in place. The mandrel is then removed as previously explained and the resulting self-supporting tube is cut into short lengths to provide bearings of the character illustrated in FIGS. 1 and 3.

It has been discovered that bearings made according to the composition of FIG. 7 have substantial compressive strength, one experiment with a bearing having a three-fourths (¾) inch outer diameter and a one-half (½) inch inner diameter resisting an eccentric load applied to a shaft inserted through the bearing of 125,000 pounds. In this particular bearing, the sizes of the two laminations 12 and 14 were respectively one-thirty-second (1/32) of an inch thick while the remainder of the bearing was composed of a lamination 36 containing the longitudinally extending glass thread fill.

While particularly surprising results have been obtained from the bearing structures of FIGS. 1, 2, 3 and 7, still other structural configurations are possible. For example, instead of the tetrafluoroethylene-cotton liner 14 being braided, individual cotton and tetrafluoroethylene threads can be extended longitudinally in side-by-side relationship. Preferably, these cotton and tetrafluoroethylene threads are alternated in an annular pattern around the bearing.

While cotton has been specified as a diluent in the liner 14, any other material may be used so long as the desired properties of lubricity are obtained. For example, in some instances it is possible to use glass thread or fibers in place of the cotton as the matrix holding the tetrafluoroethylene fibers in place.

While I have described above the principles of my invention in connection with specific apparatus, it is to be clearly understood that this description is made only by way of example and not as a limitation to the scope of my invention.

What is claimed is:

1. A hollow reinforced plastic bearing comprising a tubular element of self-supporting, hardened and cured resin, said element having inner and outer peripheral surfaces, inner and outer coaxial tubular laminations imbedded within said element, said inner lamination comprising a single layer of helically braided tetrafluoroethylene-cotton threads, a first portion of said threads extending in the form of a helix in one circumferential direction and a second portion of said threads extending in the form of a helix in the opposite circumferential direction alternately over and under the first portion threads, said threads being exposed on one side to provide said inner peripheral surface, said inner peripheral surface being free of said resin, said tetrafluoroethylene-cotton threads comprising the staple fibers of tetrafluoroethylene and cotton which are twisted together, said fibers being discontinuous throughout the thread length, said outer lamination comprising a plurality of layers of helically braided glass thread, each of the last-mentioned layers comprising first glass threads extending in the form of a helix in one circumferential direction and second glass threads extending in the form of a helix in the opposite circumferential direction alternately over and under said first glass threads.

2. The bearing of claim 1 wherein said inner and outer laminations are contiguous and said tetrafluoroethylene-cotton threads comprise a multiplicity of staple fibers of tetrafluoroethylene plastic retained in a cotton thread, the proportion of tetrafluoroethylene and cotton being approximately half and half.

3. The bearing of claim 1 wherein said resin is one of the group of polyester and epoxy resins.

4. A hollow reinforced plastic bearing comprising a tubular element of self-supporting, hardened and cured resin, said element having inner and outer peripheral surfaces, inner and outer coaxial tubular laminations imbedded within said element, said inner lamination comprising a single layer of helically braided tetrafluoroethylene-cotton threads, a first portion of said threads extending in the form of a helix in one circumferential direction and a second portion of said threads extending in the form of a helix in the opposite circumferential direction alternately over and under the first portion threads, said threads being exposed on one side to provide said inner peripheral surface, said inner peripheral surface being free of said resin, said outer lamination comprising first glass threads extending in the form of a helix in one circumferential direction and second glass threads extending in the form of a helix in the opposite circumferential direction alternately over and under said first glass threads, each said tetrafluoroethylene-cotton thread comprising staple fibers of tetrafluoroethylene and cotton which are twisted together throughout the body of the thread.

5. The bearing of claim 4 wherein the radial thickness

6. The bearing of claim 4 wherein the thread of said tetrafluoroethylene-cotton threads is of a size between 30 to 40 gauge.

7. The bearing of claim 4 wherein said resin is one of the group of polyester and epoxy resins.

References Cited in the file of this patent

UNITED STATES PATENTS

| | | |
|---|---|---|
| 2,322,771 | Palm et al. | June 29, 1943 |
| 2,783,173 | Walker et al. | Feb. 26, 1957 |
| 2,906,569 | Runton et al. | Sept. 29, 1959 |
| 2,910,329 | Runton | Oct. 27, 1959 |

UNITED STATES PATENT OFFICE
CERTIFICATE OF CORRECTION

Patent No. 3,131,979　　　　　　　　　　　　　　　May 5, 1964

Samuel M. Shobert

It is hereby certified that error appears in the above numbered patent requiring correction and that the said Letters Patent should read as corrected below.

Column 2, line 54, for "of polyester" read -- or polyester --; column 4, lines 45 and 46, for "tetraethylene" read -- tetrafluoroethylene --.

Signed and sealed this 15th day of December 1964.

(SEAL)
Attest:

ERNEST W. SWIDER　　　　　　　　　　　　　　EDWARD J. BRENNER
Attesting Officer　　　　　　　　　　　　　　Commissioner of Patents